United States Patent
Graham et al.

(10) Patent No.: US 10,415,484 B2
(45) Date of Patent: Sep. 17, 2019

(54) ENGINE CONTROL SYSTEM

(71) Applicant: Rolls-Royce Corporation, Indianapolis, IN (US)

(72) Inventors: Kenneth L. Graham, Indianapolis, IN (US); Robert C. Dalley, Waldron, IN (US); John Joseph Costello, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 84 days.

(21) Appl. No.: 15/686,495

(22) Filed: Aug. 25, 2017

(65) Prior Publication Data

US 2019/0063334 A1 Feb. 28, 2019

(51) Int. Cl.
*F02C 9/00* (2006.01)
*F02B 7/00* (2006.01)
(Continued)

(52) U.S. Cl.
CPC .................. *F02C 9/28* (2013.01); *F02C 7/04* (2013.01); *F02C 7/22* (2013.01); *F02C 3/04* (2013.01);
(Continued)

(58) Field of Classification Search
CPC ...... F02C 9/00; F02C 9/28; F02C 7/00; F02C 7/04; F02C 7/22; F02B 43/00;
(Continued)

(56) References Cited

U.S. PATENT DOCUMENTS 6,739,177 B2 * 5/2004 Sato .................... F02D 41/0037
73/114.71
8,020,538 B2 * 9/2011 Surnilla ................. F02M 26/47
123/568.12
(Continued)

FOREIGN PATENT DOCUMENTS

| EP | 1698829 A2 | 9/2006 |
| EP | 2741003 A2 | 6/2014 |
| WO | 2015040569 A1 | 3/2015 |

OTHER PUBLICATIONS

"Caldwell Energy Relies on Vaisala HMT333 Humidity and Temperature Transmitters for Turbine Inlet Air Cooling Systems", VAISALA/Success Story, 2014, 2 pgs., Retrieved from c. http://www.vaisala.com/Vaisala%20Documents/Success%20Stories/CENTIA-Caldwell%20Energy_Success%20Story_B211409EN-A.pdf Applicant points out, in accordance with MPEP 609.04(a), that the year of publication, 2014, is sufficiently earlier than the effective U.S. filing date, Aug. 25, 2017 so that the particular month of publication is not in issue.
(Continued)

*Primary Examiner* — Yonel Beaulieu
(74) *Attorney, Agent, or Firm* — Shumaker & Sieffert, P.A.

(57) ABSTRACT

An example engine control system may include an oxygen intake sensor; a fuel delivery device to control a rate of fuel delivery to the engine combustor; a combustor pressure sensor; a combustor temperature sensor; and a controller to receive at least one of an oxygen intake signal, a combustor pressure signal, and a combustor temperature signal; determine at least one of a reference specific fuel consumption (SFC) of the engine or a reference amount of a respective exhaust gas of a plurality of exhaust gases based on the oxygen signal, the pressure signal, and the temperature signal; compare at least one of the reference SFC or the
(Continued)

reference amount of a respective exhaust gas to a respective threshold value; and control the fuel delivery device to control the rate of fuel delivery based on the comparison.

20 Claims, 4 Drawing Sheets

(51) Int. Cl.
    *F02B 7/04* (2006.01)
    *F02C 3/00* (2006.01)
    *F02C 9/28* (2006.01)
    *F02C 7/04* (2006.01)
    *F02C 7/22* (2006.01)
    *F02C 3/04* (2006.01)

(52) U.S. Cl.
    CPC .... *F05D 2220/323* (2013.01); *F05D 2270/07* (2013.01); *F05D 2270/08* (2013.01); *F05D 2270/301* (2013.01); *F05D 2270/303* (2013.01); *F05D 2270/80* (2013.01)

(58) Field of Classification Search
    CPC .......... F02B 43/02; F02B 43/04; F02B 43/10; F02B 45/00; F02D 41/00; F02D 41/0002; F02D 41/0025
    See application file for complete search history.

(56) References Cited

U.S. PATENT DOCUMENTS

| | | | | |
|---|---|---|---|---|
| 8,336,508 | B2* | 12/2012 | Huttner | F02B 43/10 123/1 A |
| 9,234,476 | B2* | 1/2016 | Hakeem | F02D 41/144 |
| 9,328,679 | B2* | 5/2016 | Clark | F02D 41/0052 |
| 9,518,529 | B2 | 12/2016 | Surnilla et al. | |
| 2002/0139360 | A1* | 10/2002 | Sato | F02D 41/0037 123/698 |
| 2010/0064989 | A1* | 3/2010 | Huttner | F02B 43/10 123/3 |
| 2011/0054763 | A1* | 3/2011 | Oehlerking | F02D 41/0007 701/108 |
| 2011/0265487 | A1 | 11/2011 | Gauthier et al. | |
| 2012/0090326 | A1 | 4/2012 | Rofka et al. | |
| 2014/0208755 | A1 | 7/2014 | Ekanayake et al. | |
| 2015/0051811 | A1* | 2/2015 | Song | F02D 41/144 701/104 |
| 2017/0145924 | A1 | 5/2017 | Zhang et al. | |

OTHER PUBLICATIONS

Extended Search Report from counterpart European Application No. 18185508.1, dated Jan. 8, 2019, 7 pp.

* cited by examiner

ENGINE CONTROL SYSTEM

TECHNICAL FIELD

The present disclosure generally relates to control of engines.

BACKGROUND

An engine control system may be designed to satisfy performance requirements, emissions requirements, or both. To satisfy these requirements, an engine control system may control a delivery of fuel to a combustor of the engine based on at least one operating condition of the engine. Control of the delivery of fuel may affect the oxygen-to-fuel ratio in the combustor of the engine. The oxygen-to-fuel ratio may affect a specific fuel consumption of the engine, a profile of emissions in an exhaust of the engine, or both.

SUMMARY

In some examples, the disclosure describes a system that includes an intake sensor, a fuel delivery device, a pressure sensor, a temperature sensor, and a computing device. The intake sensor may transmit an oxygen signal indicative of an amount of oxygen at an intake of an engine. The fuel delivery device may control a rate of fuel delivery from a fuel source to a combustor of the engine. The pressure sensor may transmit a pressure signal indicative of a pressure in the combustor. The temperature sensor may transmit a temperature signal indicative of a temperature in the combustor. The controller may receive at least one of the oxygen signal, the pressure signal, and the temperature signal. The controller may also determine at least one of a reference specific fuel consumption (SFC) of the engine or a reference amount of a respective exhaust gas of a plurality of exhaust gases based on the oxygen signal, the pressure signal, and the temperature signal. The controller may also compare at least one of the reference SFC or the reference amount of a respective exhaust gas of a plurality of exhaust gases to a respective threshold value. The controller may also control the fuel delivery device to control the rate of fuel delivery based on the comparison.

In some examples, the disclosure describes a method that includes receiving, by a computing device, at least one of an oxygen signal indicative of an amount of oxygen at an intake of an engine, a pressure signal indicative of a pressure in a combustor of the engine, and a temperature signal indicative of a temperature in the combustor. The method also includes determining, by the computing device, at least one of a reference SFC of the engine or a reference amount of a respective exhaust gas of a plurality of exhaust gases based on at least one of the oxygen signal, the pressure signal, and the temperature signal. The method also includes comparing, by the computing device, at least one of the reference SFC or the reference amount of a respective exhaust gas of a plurality of exhaust gases to a respective threshold value. The method also includes controlling, by the computing device, the fuel delivery device to control the rate of fuel delivery based on the comparison.

In some examples, the disclosure describes a non-transitory computer-readable storage medium storing instructions that, when executed, cause a processor to receive, by a controller, an oxygen signal indicative of an amount of oxygen at an intake of an engine, a pressure signal indicative of a pressure in a combustor of the engine, and a temperature signal indicative of a temperature in the combustor. When executed, the instructions may also cause a processor to determine, by the controller, at least one of a reference specific fuel consumption (SFC) of the engine or a reference amount of a respective exhaust gas of a plurality of exhaust gases based on at least one of the oxygen signal, the pressure signal, and the temperature signal. When executed, the instructions may also cause a processor to compare, by the controller, at least one of the reference SFC or the reference amount of a respective exhaust gas of a plurality of exhaust gases to a respective threshold value. When executed, the instructions may also cause a processor to control, by the controller, the fuel delivery device to control the rate of fuel delivery based on the comparison.

The details of one or more examples are set forth in the accompanying drawings and the description below. Other features, objects, and advantages will be apparent from the description and drawings, and from the claims.

DETAILED DESCRIPTION

Figure 1:
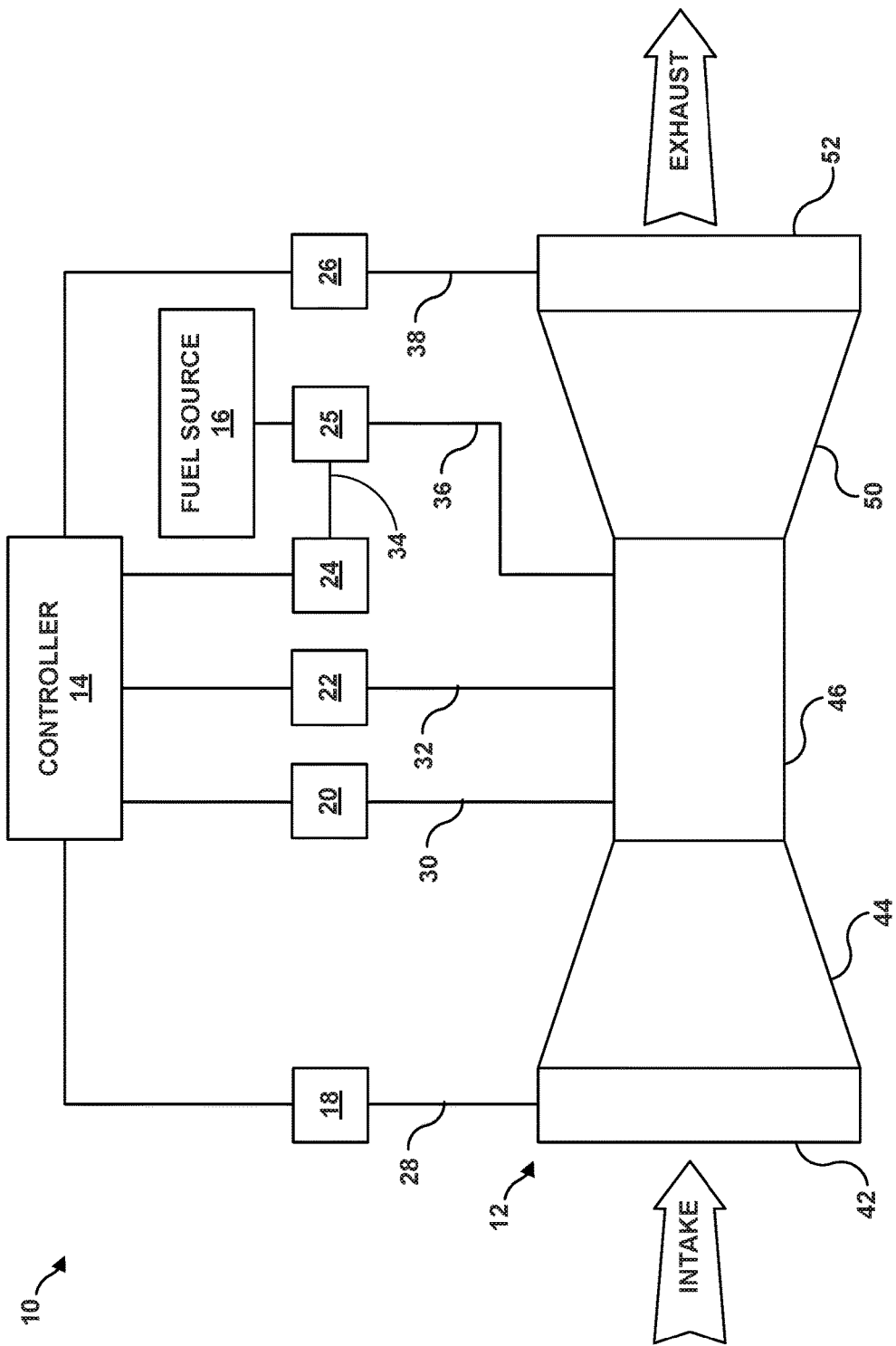
FIG. 1 is conceptual and schematic block diagram illustrating an example engine control system that includes a controller for controlling operation of an engine based at least in part on the amount of oxygen at the engine intake.

The disclosure describes systems and techniques for controlling operation of an engine. An example engine control system includes an intake sensor configured to transmit an oxygen signal indicative of an amount of oxygen at an intake of the engine. The engine control system may include a fuel delivery device configured to control a rate of fuel delivery from a fuel source to a combustor of the engine. The engine control system also may include a pressure sensor configured to transmit a pressure signal indicative of a pressure in the combustor and a temperature sensor configured to transmit a temperature signal indicative of a temperature in the combustor. The engine control system may include a controller configured to receive the oxygen signal, the pressure signal, and the temperature signal. The controller may then determine at least one of a reference specific fuel consumption (SFC) of the engine or a reference amount of a respective exhaust gas of a plurality of exhaust gases based on at least the oxygen signal, the pressure signal, and the temperature signal. The controller also may compare at least one of the reference SFC or the reference amount of a respective exhaust gas of a plurality of exhaust gases to a respective threshold value. The controller may then control the fuel delivery device to control the rate of fuel delivery based on the comparison.

An internal combustion engine, such as, for example, gas turbine engine, may provide propulsion for a vehicle, such as, for example, an aircraft. A gas turbine engine may include at least an air intake, a compressor station, a combustor station, a turbine station, and an exhaust. Fuel may be delivered to, and burned in, the combustor station to produce thrust, shaft work, or both. The efficiency of an engine may be measured as the SFC (e.g., thrust per amount of fuel consumed over time). The efficiency of an engine also may be measured by the amount and types of exhaust gases (e.g., the exhaust gas profile).

The SFC and the exhaust gas profile may be affected, at least in part, by the oxygen-to-fuel ratio (e.g., air-fuel ratio) in the combustor, the temperature in the combustor, the pressure in the combustor, and the like. For example, a stoichiometric mixture may include an oxygen-to-fuel ratio that includes the exact amount of oxygen required to burn all fuel delivered to the combustor. An oxygen-to-fuel ratio may be higher or lower than the stoichiometric mixture. In examples where the oxygen-to-fuel ratio is lower than the stoichiometric mixture, e.g., a rich mixture, the combustion of the fuel may be incomplete. Incomplete combustion of the fuel may result in an increased concentration of fuel vapor or partial combustion products (e.g., elemental carbon, carbon monoxide, or the like) in the exhaust, compared to complete combustion. Incomplete combustion also may reduce the SFC due to increased fuel use for a given amount of thrust. For example, at least a portion of the chemical energy of the fuel may not be released, which may result in a cooler burn of the fuel.

In examples where the oxygen-to-fuel ratio is higher than the stoichiometric mixture, e.g., a lean mixture, the combustion may be complete. Complete combustion also may increase the SFC. For example, substantially all of the chemical energy of the fuel may be released, which may result in a hotter burn. Complete combustion of the fuel also may result in an increased concentration of nitrogen oxides and a reduced concentration of carbon monoxide, compared to incomplete combustion. For example, the formation of nitrogen oxides is thermodynamically favored at higher temperatures compared to lower temperatures. In this way, controlling the air-to-fuel ratio may enable control of the SFC and the exhaust gas profile.

The disclosure describes systems and techniques that include an engine control system for controlling the oxygen-to-fuel ratio to enable control of the SFC and the exhaust gas profile. The engine control system may include, for example, at least one sensor at an inlet of the engine to determine the amount of oxygen available for combustion in the combustor. The amount of oxygen available for combustion may determine, at least in part, the amount of fuel to be delivered to the combustor to result in a substantially complete combustion, e.g., a lean mixture.

The engine control system also may include a fuel delivery device to control the amount of fuel delivered to the combustor, e.g., in response to the amount of oxygen sensed by the at least one sensor at the inlet of the engine. The engine control system may include at least one sensor to determine a pressure, a temperature, or both, in at least one of the combustor station, the turbine station, and the exhaust station. The amount of oxygen available for combustion and conditions of the combustor may be associated with a reference exhaust gas profile, a reference SFC, or both. The engine control system may include at least one sensor to determine a measured exhaust gas profile that may be compared to the reference exhaust gas profile. By controlling fuel delivery rate based on an amount of oxygen available for reaction in the combustor, a temperature in at least one of the combustor station, the turbine station, and the exhaust station, a pressure in at least one of the combustor station, the turbine station, and the exhaust station, and, optionally, an amount of exhaust gas species in the exhaust, the engine control system may improve specific fuel consumption, reduce emissions, or both, compared to an engine control system without the intake oxygen sensor, combustor pressure sensor, and combustor temperature sensor.

FIG. 1 is a conceptual and schematic diagram illustrating an example engine control system 10. Engine control system 10 includes engine 12, controller 14, fuel source 16, and fuel delivery device 25. In some examples, engine 12 may include at least one internal combustion engine, such as, for example, at least one continuous combustion engine. In some examples, engine 12 may include at least one gas turbine engine. In examples in which engine 12 includes at least one gas turbine engine, engine 12 may include a plurality of stations including intake station 42, compressor station 44, combustor 46, turbine station 50, and exhaust station 52. In some examples, intake station 42 may include a kinetic compression station (e.g., SAE International, AS755F, station Ø1Ø to Ø2Ø). Intake station 42 may intake air into engine 12 and may increase the pressure of the air compared to the ambient pressure. In some examples, compressor station 44 may include at least one mechanical compression station (e.g., station Ø2Ø to Ø3Ø), such as, for example an axial compressor, a centrifugal compressor, a mixed-flow compressor, or the like. Compressor station 44 may increase the pressure of the intake air compared to the ambient pressure. In some examples, compressor station 44 may include one or more stages, such as, for example, a low-pressure compressor stage and a high-pressure compressor stage.

Combustor 46 may include a heat addition station (e.g., station Ø3Ø to Ø4Ø). For example, combustor 46 may be configured to combust a fuel to produce combustion gases and heat in combustor 46. In some examples, turbine station 50 may include at least one mechanical expansion station (e.g., station Ø4Ø to Ø5Ø). Turbine station 50 may convert energy from the expanding combustion gases into shaft work. In some examples, turbine station 50 may include one or more stages, such as, for example, a low-pressure turbine stage and a high-pressure turbine stage. In some examples, exhaust station 52 may include a mixing station (e.g., station Ø5Ø to Ø7Ø), a kinetic expansion station (e.g., station Ø7Ø to Ø9Ø), or both. Exhaust station 52 may exhaust combustion gases from engine 12. In some examples, engine 12 may include fewer stations or more stations. Engine 12 may be mounted on a vehicle, such as, for example, an aircraft, a land craft, or watercraft. In some examples, engine 12 may be configured to provide thrust or shaft work to propel a vehicle.

Fuel source 16 may include any suitable fuel source to supply a fuel to engine 12. For example, the fuel source 16 may include any suitable vessel to store a fuel. The fuel may include any suitable fuel or fuel mixture to power engine 12. In some examples, the fuel may include aviation turbine fuel.

Fuel delivery device 25 may be configured to control a rate of fuel delivery from fuel source 16 to combustor 46 of engine 12. In some examples, fuel delivery device 25 may include a variable flow rate fuel pump. For example, fuel delivery device 25 may include a positive displacement pump, a centrifugal pump, a turbopump, or the like. In some examples, fuel delivery device 25 may be fluidically coupled to combustor 46 by fuel supply line 36. In some examples, fuel delivery device 25 or a sensor associated with fuel delivery device 25 or fuel supply line 36 may be configured to transmit a fuel flow rate signal indicative of a fuel flow rate from fuel supply to combustor 46. For example, fuel delivery device 25 may include a flow meter configured to determine the fuel flow rate in fuel supply line 36. In some examples, a fuel supply system that includes fuel source 16 and fuel delivery device 25 may include other components, such as, for example, additional fuel sources, fuel additive sources, oxidant sources, additional pumps, pressure regulators, filters, mixers, flow meters, or the like.

Engine control system 10 includes intake sensor 18, pressure sensor 20, and temperature sensor 22. Intake sensor 18 may be configured to transmit an oxygen signal indicative of an amount of oxygen at intake station 42 of engine 12. For example, intake sensor 18 may be located in or near intake station 42 or compressor station 44. In some examples, intake sensor 18 may be fluidically coupled to intake station 42, e.g., by at least one fluid channel 28. Intake sensor 18 may include at least one dynamic sensor that may determine a concentration of oxygen in an air intake stream (e.g., mass concentration, volume concentration, molar concentration, or the like). In some examples, intake sensor 18 may include at least one sensor that may determine a flow rate of the air intake stream (e.g., mass flow rate, volumetric flow rate, or the like). The concentration of oxygen in the air intake stream and flow rate of the air intake stream may be used to indicate an amount of oxygen at intake station 42. In some examples, oxygen sensor 18 may include an intake pressure sensor, an intake temperature sensor, or both, configured to measure an intake pressure, an intake temperature, or both, of the air intake stream to determine the amount of oxygen at the intake. For example, the amount of oxygen may be based on at least one of a concentration of oxygen at the air intake, a flow rate at the air intake, a pressure at the air intake, or a temperature at the air intake.

In some examples, intake sensor 18 may convert at least one of the concentration of oxygen at the air intake, the flow rate at the air intake, the pressure at the air intake, and the temperature at the air intake into an electronic or optical oxygen signal that may be transmitted to controller 14. In other examples, intake sensor 18 may determine an amount of oxygen at intake station 42 based on at least one of the concentration of oxygen at the air intake, the flow rate at the air intake, the pressure at the air intake, and the temperature at the air intake, and convert the determined amount of oxygen at intake station 42 into an electronic or optical signal that may be transmitted to controller 14. In some examples, intake sensor 18 may be communicatively coupled to controller 14 by at least one electrical connection, fiberoptic connection, or wireless connection. In this way, oxygen sensor 18 may communicate to controller 14 an oxygen signal representative of an amount of oxygen at intake station 42 in real-time.

Pressure sensor 20 may be configured to transmit a pressure signal indicative of a pressure in combustor 46. In some examples, pressure sensor 20 may include at least one sensor that may determine a pressure in combustor 46. For example, pressure sensor 20 may include at least one dynamic pressure sensor configured to determine a pressure or a change in pressure in combustor 46. The pressure signal may include an absolute pressure, a gauge pressure, a pressure differential, or the like. Pressure sensor 20 may be located in or near combustor 46. In some examples, pressure sensor 20 may be fluidically coupled to combustor 46, e.g., by at least one fluid channel 30. Pressure sensor 20 may convert the determined pressure into an electronic or optical pressure signal that may be transmitted to controller 14. For example, pressure sensor 20 may be communicatively coupled to controller 14 by at least one electrical connection, fiberoptic connection, or wireless connection. In this way, pressure sensor 20 may communicate to controller 14 a pressure signal representative of a pressure in combustor 46 in real-time.

Temperature sensor 22 may be configured to transmit a temperature signal indicative of a temperature in at least one of combustor 46, turbine station 50, and exhaust station 52. In some examples, temperature sensor 22 may include at least one dynamic sensor that may determine a temperature in at least one of combustor 46, turbine station 50, and exhaust station 52. For example, temperature sensor 22 may include at least one thermocouple sensor configured to determine a temperature or temperature change in at least one of combustor 46, turbine station 50, and exhaust station 52. The temperature signal may include any suitable temperature scale, temperature differential, or the like. In some examples, as shown in FIG. 1, temperature sensor 22 may be located in or near combustor 46. For example, temperature sensor 22 may be fluidically coupled to combustor 46, e.g., by at least one fluid channel 32. In other examples, temperature sensor 22 (or additional temperature sensors) may be located in or near turbine station 50, exhaust station 52, or both. Temperature sensor 22 may convert the determined temperature into an electronic or optical temperature signal that may be transmitted to controller 14. For example, temperature sensor 22 may be communicatively coupled to controller 14 by at least one electrical connection, fiberoptic connection, or wireless connection. In this way, temperature sensor 22 may communicate to controller 14 a temperature signal representative of a temperature at least one of combustor 46, turbine station 50, and exhaust station 52 in real-time.

In some examples, engine control system 10 may include fuel sensor 24. Fuel sensor 24 may be configured to transmit a fuel oxygen signal indicative of an amount of oxygen in the fuel delivered to combustor 46. In some examples, fuel sensor 24 may include one or more dynamic sensors that may determine a concentration of oxygen in the fuel delivered to combustor 46, the flow rate of fuel delivered to combustor 46, or both. The concentration of oxygen in the fuel and the flow rate of the fuel may be used to determine an indication of an amount of oxygen in the fuel delivered to combustor 46. In some examples, fuel sensor 24 may be located in or near fuel delivery device 25. For example, fuel sensor 24 may be fluidically coupled to fuel delivery device 25, e.g., by at least one fluid channel 34. In other examples, fuel sensor 24 may be located in or near fuel source 16, fuel supply line 36, or the like. In some examples, fuel sensor 24 may convert the determined concentration of oxygen in the fuel, flow rate of the fuel, or both into an electronic or optical fuel oxygen signal that may be transmitted to controller 14. In other examples, fuel oxygen sensor 24 may determine an amount of oxygen in the fuel delivered to combustor 46 based on the determined concentration of oxygen in the fuel, flow rate of the fuel, or both, and convert the determined amount of oxygen in the fuel delivered to combustor 46 into an electronic or optical signal that may be transmitted to controller 14. For example, fuel sensor 24 may be communicatively coupled to controller 14 by at least one electrical connection, fiberoptic connection, or wireless connection. In this way, fuel sensor 24 may communicate to controller 14 a fuel oxygen signal representative of an amount of oxygen in the fuel delivered to combustor 46 in real-time.

In some examples, engine control system 10 may include exhaust sensor 26. Exhaust sensor 26 may be configured to transmit an exhaust gas signal indicative of an amount of one or more respective exhaust gases of a plurality of exhaust gases at exhaust 52 of engine 12. In some examples, exhaust sensor 26 may include one or more sensors that may determine a concentration of at least one respective exhaust gas (e.g., at least one gas species) of a plurality of exhaust gases in exhaust 52. The plurality of exhaust gases may include at least one of oxygen, an oxocarbon (e.g., carbon monoxide or carbon dioxide), a nitrogen oxide (e.g., nitric oxide, nitrogen dioxide, nitrous oxide, or the like), a hydrocarbon (e.g., a saturated hydrocarbon, an unsaturated hydrocarbon, an aromatic hydrocarbon, or the like), and an aldehyde (e.g., formaldehyde, or the like). In some examples, exhaust sensor 26 may be located in or near exhaust station 52. For example, exhaust sensor 26 may be fluidically coupled to exhaust station 52, e.g., by at least one fluid channel 38. In other examples, exhaust sensor 26 may be located in or near turbine station 50, or otherwise downstream of combustor 46.

In some examples, exhaust sensor 26 may convert the determined concentration of the at least one respective exhaust gas into an electronic or optical fuel oxygen signal that may be transmitted to controller 14. For example, exhaust sensor 26 may be communicatively coupled to controller 14 by at least one electrical connection, fiberoptic connection, or wireless connection. In this way, exhaust sensor 26 may communicate to controller 14 an exhaust gas signal representative of the concentration of at least one respective exhaust gas in real-time.

Controller 14 is configured to control operation of engine control system 10. For example, controller 14 may be configured to control operation of at least fuel delivery device 25. Controller 14 may be implemented, at least in part, in hardware, software, firmware, or any combination thereof. For example, controller 14 may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same physical device or within separate physical devices to support the various techniques described in this disclosure. In addition, any of the described units, modules or components may be implemented together or separately as discrete but interoperable logic devices.

Although not shown in FIG. 1, engine control system 10 may include one or more power sources. In some examples, one or more power source may be electrically coupled to each of controller 14, intake sensor 18, pressure sensor 20, temperature sensor 22, fuel oxygen sensor 24, fuel delivery device 25, and exhaust sensor 26. In other examples, one or more power sources may be electrically coupled to controller 14, which may be electrically couple each of intake sensor 18, pressure sensor 20, temperature sensor 22, fuel oxygen sensor 24, fuel delivery device 25, and exhaust sensor 26.

As described above, controller 14 may be configured to receive the oxygen signal, the pressure signal, and the temperature signal from the respective sensors 18, 20, and 22. The oxygen signal may be indicative of the amount of oxygen in the intake gases at intake station 42. In some examples, the oxygen signal includes a value of the amount of oxygen in the intake gases at intake station 42. In other examples, controller 14 may determine the amount of oxygen in intake station 42 based on an oxygen signal that includes information indicative of the amount of oxygen, such as at least one of the concentration of oxygen at the air intake, the flow rate at the air intake, the pressure at the air intake, and the temperature at the air intake. Controller 14 may be configured to determine at least one of a reference SFC of engine 12, a reference amount of a respective exhaust gas of a plurality of exhaust gases, or both, based on at least the oxygen signal, the pressure signal, and the temperature signal. The reference SFC may define an amount of fuel consumed per unit of thrust over a time period. The plurality of exhaust gases may include those described above.

In some examples, controller 14 may determine the at least one of the SFC of engine 12, the reference amount of the respective exhaust gas, or both, based on predetermined correlations between values associated with the oxygen signal, values associated with the pressure signal, and values associated with the temperature signal and values for the SFC, the reference amount of exhaust gas, or both. For example, controller 14 may associate respective sets of values associated with the oxygen signal, the pressure signal, and the temperature signal with a corresponding reference SFC, a corresponding reference amount of a respective exhaust gas, or both based on at least one predetermined correlation. The plurality of predetermined correlations may be empirically or theoretically derived. For example, the plurality of predetermined correlations may be based on experimental engine performance data. In some examples, the plurality of predetermined correlations may be stored as entries in a look-up table stored by a memory device associated with or accessible by controller 14.

In other examples, controller 14 may determine the at least one of the SFC of engine 12, the reference amount of the respective exhaust gas, or both, based on a reference model of engine 12 executed by controller 14. For example, controller 14 may estimate performance of engine 12 by tracking engine parameters and estimating unmeasured engine parameters using an adaptive, real-time engine model of engine 12. Unmeasured engine parameters may include, for example, specific fuel consumption, high pressure turbine entry temperature, compressor surge margin, and thrust. Controller 14 may estimate one or more unmeasured engine parameters based on actuator information and engine information using the reference model. Engine information may include, for example, fuel flow rate, air flow rate, actuator position, intake oxygen concentration, temperatures, pressures, and the like. Actuator information may include, for example, inlet vanes position, fuel control valve position, exhaust nozzles position, and the like. In this way, controller 14 may determine the reference SFC, the reference amount of a respective exhaust gas, or both based on the reference model of engine 12 and at least the oxygen signal, the pressure signal, and the temperature signal.

Controller 14 may be configured to compare at least one of the reference SFC or the reference amount of a respective exhaust gas of a plurality of exhaust gases to a respective threshold value. The respective threshold value may be associated with a respective operating condition of engine 12 (e.g., respective engine information, respective actuator information, or both). The respective threshold value also may be associated with a respective fuel flow rate. For example, the respective fuel flow rate may result in a respective threshold SFC, threshold concentration of a respective exhaust gas, or both. Additionally, or alternatively, the respective threshold value may be based on at least the exhaust gas signal. For example, controller 14 may determine a respective threshold that includes a respective threshold amount of a respective exhaust gas based on at least the exhaust gas signal. In this way, the respective threshold value may be different for different operating conditions, e.g., different throttle conditions that include different fuel flow rates, different combustor temperatures that include different exhaust gas profiles, or the like.

Controller 14 may be configured to control fuel delivery device 25 to control the rate of fuel delivery based on the comparison. Controlling the rate of fuel delivery affects at least one of an actual SFC of the engine 12 or the actual amount of one or more respective exhaust gases of the plurality of exhaust gases. For example, controller 14 may control the rate of fuel delivery to result in a subsequent SFC or a subsequent amount of a respective exhaust gas that is more similar to or below the respective threshold value.

For example, where the reference SFC is greater than the threshold value, controller 14 may control fuel delivery device 25 to reduce the rate of fuel delivery. The reduction in the rate of fuel delivery may reduce the actual SFC. The controller then may iteratively determine a subsequent SFC, compare the subsequent SFC to the threshold value, and adjust the fuel delivery rate until the subsequent SFC is within the threshold value.

In some examples, where the reference amount of a respective exhaust gas, e.g., nitrogen dioxide, is greater than the threshold value, controller 14 may control fuel delivery device 25 to reduce the rate of fuel delivery. The reduction in the rate of fuel delivery may reduce the temperature in combustor 46. The reduction in the temperature in combustor 46 may affect the exhaust gas profile, e.g., reduce production of nitrogen dioxide.

In other examples, where the reference amount of a respective exhaust gas, e.g., carbon monoxide, is greater than the threshold value, controller 14 may control fuel delivery device 25 to reduce the rate of fuel delivery. The reduction in the rate of fuel delivery may increase the oxygen-to-fuel ratio. Increasing the oxygen-to-fuel ratio may affect the exhaust gas profile, e.g., result in complete combustion of the fuel and reduction in carbon monoxide production. By controlling the rate of fuel delivery based on the comparison of the at least one of the reference SFC or the reference amount of a respective exhaust gas of a plurality of exhaust gases to a respective threshold value, controller 14 may control the performance of engine 12, emissions of engine 12, or both.

As discussed above, in some examples, controller 14 may be configured to receive a fuel oxygen signal from fuel sensor 24. Controller 14 may be configured to determine at least one of the reference SFC or the reference amount of a respective exhaust gas of a plurality of exhaust gases based on at least the total amount of oxygen in the fuel delivered to the combustor and oxygen at intake 42 of engine 12. By utilizing a total amount of oxygen present in the intake gases and the fuel, controller 14 may more accurately determine the reference SFC or the reference amount of a respective exhaust gas than when controller 14 only utilizes an amount of oxygen in the intake gases. Additionally, or alternatively, controller 14 may be configured to receive the exhaust gas signal. Controller 14 may be configured to determine at least the reference SFC based on at least the exhaust gas signal. Utilizing the exhaust gas signal similarly may enable controller 14 to more accurately determine the reference SFC.

Figure 2:
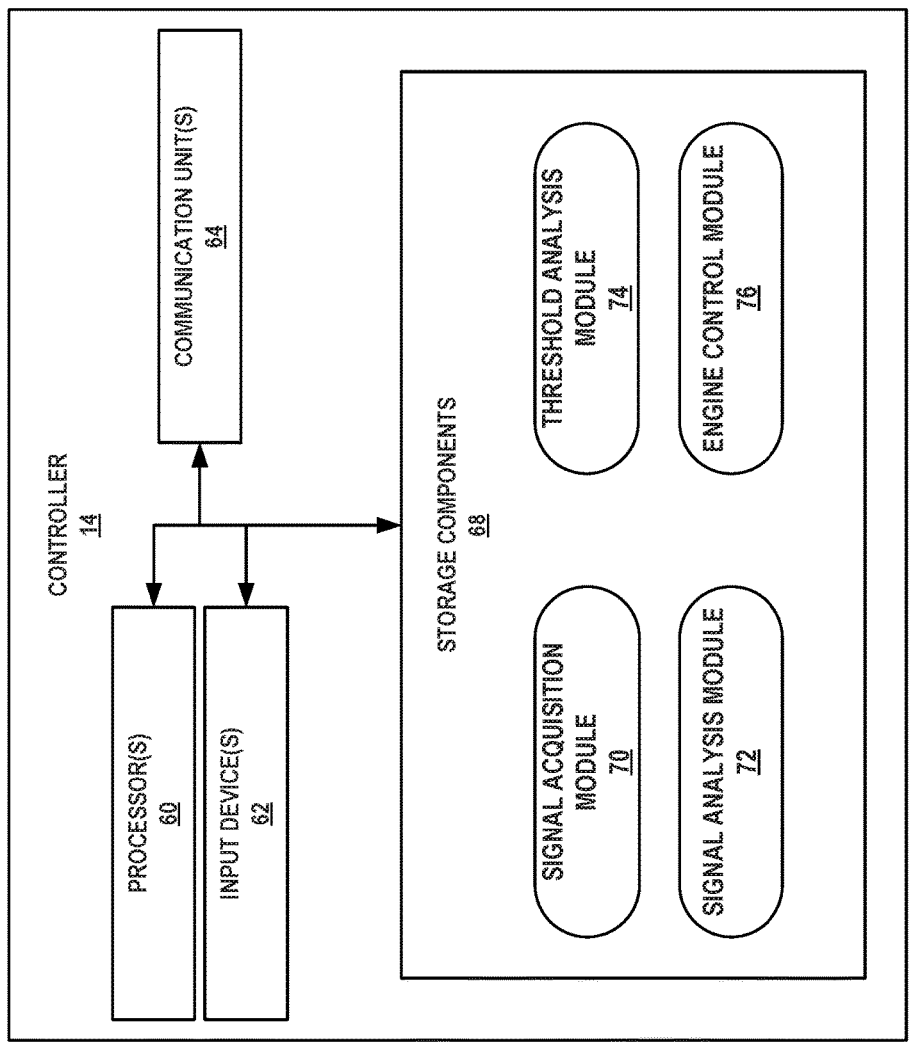
FIG. 2 is a conceptual and schematic block diagram illustrating the controller illustrated in FIG. 1.

FIG. 2 is a conceptual and schematic block diagram illustrating an example of controller 14 illustrated in FIG. 1. Controller 14 includes one or more processors 60, one or more input devices 62, one or more communication units 64, and one or more storage components 68. In some examples, one or more storage components 68 includes signal acquisition module 70, signal analysis module 72, threshold analysis module 74, and engine control module 76. In other examples, controller 14 may include additional components or fewer components than those illustrated in FIG. 2.

One or more processors 60 are configured to implement functionality and/or process instructions for execution within controller 14. For example, processors 60 may be capable of processing instructions stored by one or more storage components 68. Examples of one or more processors 60 may include any one or more of a microprocessor, a controller, a digital signal processor (DSP), an application specific integrated circuit (ASIC), a field-programmable gate array (FPGA), or equivalent discrete or integrated logic circuitry, as discussed above.

Controller 14 also includes one or more input devices 62. Input devices 62, in some examples, are configured to receive input from a user or vehicle control system. User input may include control input by primary controls or secondary controls (e.g., throttle, pitch, roll, yaw, flaps, or the like). Vehicle control system input may include, for example automated vehicle control systems (e.g., automated flight control systems), operating environment monitoring systems, or the like.

Controller 14 further includes one or more communication units 64. Controller 14 may utilize communication units 64 to communicate with external devices via one or more networks, such as one or more wired or wireless networks. Communication units 64 may be a network interface card, such as an Ethernet card, an optical transceiver, a radio frequency transceiver, or any other type of device that can send and receive information. Other examples of such network interfaces may include WiFi™ radios or USB. In some examples, controller 14 utilizes communication units 64 to wirelessly communicate with an external device such as a server. For example, controller 14 may be configured to wirelessly communicate engine performance or diagnostic information to an external server.

One or more storage components 68 may be configured to store information within controller 14 during operation. One or more storage components 68, in some examples, include a computer-readable storage medium or computer-readable storage device. In some examples, one or more storage components 68 include a temporary memory, meaning that a primary purpose of one or more storage components 68 is not long-term storage. One or more storage components 68, in some examples, include a volatile memory, meaning that one or more storage components 68 does not maintain stored contents when power is not provided to one or more storage components 68. Examples of volatile memories include random access memories (RAM), dynamic random-access memories (DRAM), static random-access memories (SRAM), and other forms of volatile memories known in the art. In some examples, one or more storage components 68 are used to store program instructions for execution by processors 60. One or more storage components 68, in some examples, are used by software or applications running on controller 14 to temporarily store information during program execution.

In some examples, one or more storage components 68 may further include one or more storage components 68 configured for longer-term storage of information. In some examples, one or more storage components 68 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Controller 14 also may include signal acquisition module 70, signal analysis module 72, threshold analysis module 74, and engine control module 76. Each of signal acquisition module 70, signal analysis module 72, threshold analysis module 74, and engine control module 76 may be implemented in various ways. For example, one or more of signal acquisition module 70, signal analysis module 72, threshold analysis module 74, and engine control module 76 may be implemented as an application or a part of an application or firmware executed by one or more processors 60. In other examples, one or more of signal acquisition module 70, signal analysis module 72, threshold analysis module 74, and engine control module 76 may be implemented as part of a hardware unit of controller 14 (e.g., as circuitry). Controller 14 may include additional components that, for clarity, are not shown in FIG. 2. For example, controller 14 may include a power supply to provide power to the components of controller 14. Similarly, the components of controller 14 shown in FIG. 2 may not be necessary in every example of controller 14.

Signal acquisition module 70 may be configured to receive a signal transmitted by a sensor. For example, signal acquisition module 70 may include hardware, software, or both to receive the oxygen signal, the pressure signal, the temperature signal, the exhaust gas signal, or the fuel oxygen signal from sensors 18, 20, 22, 26, and 24, respectively (FIG. 1). In some examples, signal acquisition module 70 may include a transceiver configured to cause a sensor to acquire and transmit a signal. For example, signal acquisition module 70 may transmit a signal to intake sensor 18 to cause intake sensor 18 to acquire the oxygen signal and transmit the oxygen signal to signal acquisition module 70.

The signal received by signal acquisition module 70 may be indicative of an operating parameter of engine 12. For example, the oxygen signal received by signal acquisition module 70 from intake sensor 18 may include a signal indicative of an amount of oxygen in the intake gases at intake station 42. In some examples, the signal may include the indicated value. For example, the oxygen signal may include the amount of oxygen in the intake gases at intake station 42. In other examples, the signal may include one or more signals that may be used to determine the indicated value. For example, the oxygen signal may include information indicative of the amount of oxygen, such as at least one of the concentration of oxygen at the air intake, the flow rate at the air intake, the pressure at the air intake, and the temperature at the air intake, such that signal acquisition module 70 (or another module of controller 14) may determine the amount of oxygen in the intake gases at intake station 42 based on the information indicative of the amount of oxygen. Similarly, the pressure signal, the temperature signal, the exhaust gas signal, or the fuel oxygen signal may include the indicated value or information indicative of the indicated value.

Signal analysis module 72 may be configured to receive information from signal acquisition module 70 and determine at least one of a reference SFC of the engine or a reference amount of a respective exhaust gas based predetermined correlations between values associated with the oxygen signal, values associated with the pressure signal, and values associated with the temperature signal and values associated with the SFC, the reference amount of exhaust gas, or both. For example, controller 14 may associate respective sets of values associated with the oxygen signal, the pressure signal, and the temperature signal with a corresponding reference SFC, a corresponding reference amount of a respective exhaust gas, or both based on at least one predetermined correlation. The plurality of predetermined correlations may be empirically or theoretically determined. The plurality of predetermined correlations may be stored as entries in a look-up table stored by a memory device associated with or accessible by controller 14. For example, controller 14 may use a look-up table to determine a value or range of values associated with at least one of the oxygen signal, the temperature signal, and the pressure signal and a corresponding value or range of values associated with a reference SFC of engine 12, a reference amount of a respective exhaust gas, or both.

In other examples, signal analysis module 72 may execute a reference model of engine 12 (FIG. 1) to determine at least one of a reference SFC of the engine, a reference amount of a respective exhaust gas, or both. For example, signal analysis module 72 may determine a reference control signal based on at least one of the oxygen signal, the pressure signal, or the temperature signal and a reference model that represents operation of engine 12. Signal analysis module 72 then may determine a demand signal based on the reference control signal. Signal analysis module 72 then may output the demand signal to control the fuel delivery device to adjust the rate of fuel delivery.

In some examples, the oxygen signal may include a trajectory of the amount of oxygen at the intake, the pressure signal may include a trajectory of the pressure in the combustor, and the temperature signal may include a trajectory of the temperature in the combustor. Controller 14 may determine a reference control signal and a reference state trajectory signal based on at least one of the trajectory of the amount of oxygen at the intake, the trajectory of the pressure in the combustor, or the trajectory of the temperature in the combustor and a reference model that represents operation of the engine. Controller 14 then may determine an adaptation signal based on a difference between the reference state trajectory signal and an engine state trajectory signal representative of actual operation of the engine. Controller 14 then may determine a demand signal based on the engine state trajectory signal, the adaptation signal, and the reference control signal. Controller 14 then may output the demand signal to control the fuel delivery device to adjust the rate of fuel delivery.

Threshold analysis module 74 may be configured to compare at least one of the reference SFC or the reference amount of a respective exhaust gas to a respective threshold value. For example, as discussed above, the respective threshold values may be associated with a respective operating condition of engine 12, e.g., a respective fuel flow rate that may result in a respective threshold SFC, threshold concentration of a respective exhaust gas, or both. In other examples, controller 14 may implement both signal analysis module 72 and threshold analysis module 74 as part of the reference model of the engine. In some examples, controller 14 may implement either signal analysis module 72 or threshold analysis module 74 as part of the reference model of the engine.

Engine control module 76 may be configured to control fuel delivery device 25 to control the rate of fuel delivery based on the comparison. By controlling the rate of fuel delivery, engine control module 76 may control at least one of an actual SFC of engine 12 or the actual amount of one or more respective exhaust gases. In this way, engine control module 76 may control the performance of engine 12, emissions of engine 12, or both.

Figure 3:
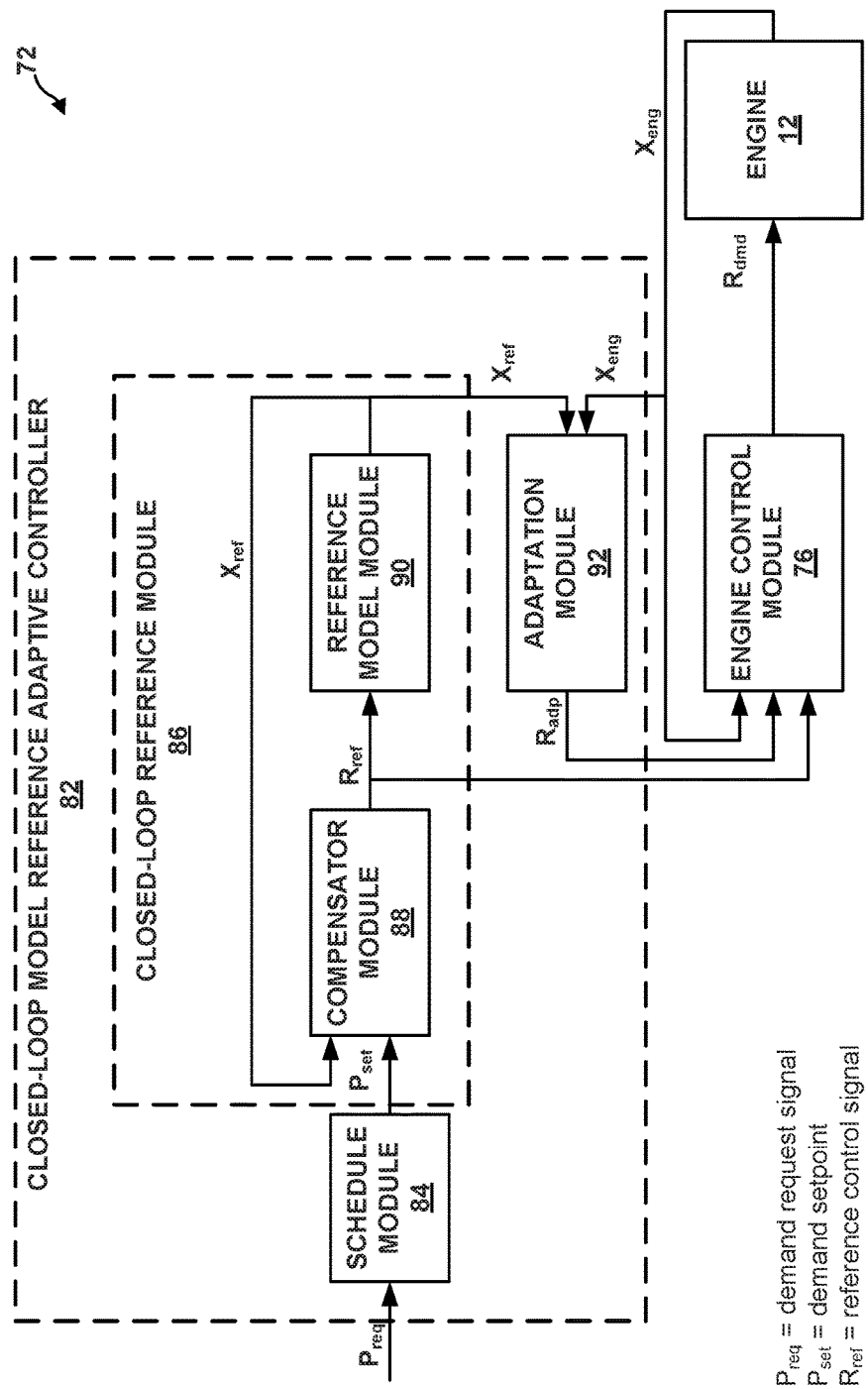
FIG. 3 is conceptual and schematic block diagram illustrating an example closed-loop model reference adaptive control module for controlling operation of an engine based at least in part on the amount of oxygen at the engine intake.

FIG. 3 is a conceptual and schematic block diagram illustrating an example signal analysis module 72 implementing a reference model of engine 12. Signal analysis module 72 may include a closed-loop model reference adaptive controller (MRAC) 82 for controlling engine 12. In some examples, closed-loop MRAC 82 includes a schedule module 84, a closed-loop reference module 86, and an adaptation module 92. In some examples, closed-loop reference module 86 may include compensator module 88 and reference model module 90. MRAC 82 and the modules included in MRAC 82 may be implemented, at least in part, in hardware, software, firmware, or any combination thereof. For example, MRAC 82 and the modules included in MRAC 82 may be implemented within one or more processors 60, as described above. MRAC 82 may be communicatively coupled to engine control module 76, engine 12 (e.g., at least one sensor associated with engine 12), or both.

Schedule module 84 may be configured to convert a demand request signal, $P_{req}$, associated with one or more engine control variables transmitted to closed-loop MRAC 82 into a demand setpoint, $P_{set}$. The demand request signal, $P_{req}$, may be a signal from, for example, a control system controlled by a user or vehicle control system requesting a selected power demand for engine 12, a selected SFC for engine 12, a selected exhaust gas profile, or the like. In some examples, the demand request signal, $P_{req}$, may be a signal from a sensor, such as, for example, oxygen sensor 18, pressure sensor 20, temperature sensor 22, fuel oxygen sensor 24, exhaust sensor 26, or the like. The demand setpoint, $P_{set}$, may be an operational setpoint for an engine control variable associated with engine 12.

To perform this conversion, schedule module 84 may receive the demand request signal, $P_{req}$, and determine a demand setpoint, $P_{set}$, based on the demand request signal, $P_{req}$. For example, schedule module 84 may include a list or database of gain schedules calibrated for particular demand setpoints, $P_{set}$, of engine controlled variables. For example, schedule module 84 may receive a demand request signal, $P_{req}$, for at least one of a particular SFC or exhaust gas profile, look up a demand setpoint, $P_{set}$, for a fuel delivery rate associated with the demand request signal, $P_{req}$, and output the demand setpoint, $P_{set}$, for the fuel delivery rate. Engine controlled variables may include, but are not limited to shaft speeds, pressure ratios, torque, air intake flow rate, and fuel delivery rate. In some examples, schedule module 84 may take into account operating conditions of engine 12 when determining the demand setpoint, $P_{set}$. For example, if engine 12 is in transient operation, schedule module 84 may use a different gain schedule than if engine 12 was in steady-state operation.

Schedule module 84 may output the demand setpoint, $P_{set}$, to closed-loop reference module 86. Closed-loop reference module 86 may represent the system that acts on at least one demand setpoint, $P_{set}$, to produce a reference control signal, $R_{ref}$. Closed-loop reference module 86 may receive the demand setpoint, $P_{set}$, from schedule module 84, determine the reference control signal, $R_{ref}$ and a reference state trajectory signal, $X_{ref}$, based on the demand setpoint, $P_{set}$. The reference control signal, $R_{ref}$, may represent a measurable, manipulated engine control variable associated with operation of engine 12. Engine control variables may include, but are not limited to, fuel flow rate and air flow rate. Each measurable engine control variable may have an associated engine component that controls the measurable engine control variable. For example, fuel flow may be controlled by a fuel valve, while air flow may be controlled by variable stator vanes. The reference state trajectory signal, $X_{ref}$, may represent the response of reference model module 90 to the reference control signal, $R_{ref}$. Closed-loop reference module 86 may output the reference control signal, $R_{ref}$, to engine control module 76, and output the reference state trajectory signal, $X_{ref}$, to adaptation module 92.

In some examples, closed-loop reference module 86 may include compensator module 88. Compensator module 88 may assist in maintaining the system stability and reducing control error by adjusting the reference control signal, $R_{ref}$, based on a closed-loop response received from reference model module 90. Compensator module 88 may receive the demand setpoint, $P_{set}$, from schedule module 84 and the reference state trajectory signal, $X_{ref}$, from reference model module 90. Compensator module 88 may determine the reference control signal, $R_{ref}$, based on the demand setpoint, $P_{set}$, and the reference state trajectory signal, $X_{ref}$. Compensator module 88 may output the reference control signal, $R_{ref}$, to reference model module 90.

Compensator module 88 may receive the reference state trajectory signal, $X_{ref}$, for a particular control reference signal and convert the reference state trajectory signal, $X_{ref}$, into an equivalent demand setpoint that would be expected for the particular reference control signal, $R_{ref}$. Compensator module 88 may adjust the reference state trajectory signal, $X_{ref}$, based on a difference between the demand setpoint, $P_{set}$, and the equivalent demand setpoint of the reference state trajectory signal, $X_{ref}$, to reduce the difference between the demand setpoint, $P_{set}$, and the equivalent demand setpoint.

Closed-loop reference module 86 may include reference model module 90. Reference model module 90 may represent an ideal reference model of engine 12 that simulates a response of engine 12 to the reference control signal, $R_{ref}$. Compensator module 88 may use the response to further adjust the reference control signal, $R_{ref}$. Reference model module 90 may receive the reference control signal, $R_{ref}$, from compensator module 88 and determine the reference state trajectory signal, $X_{ref}$, based on the reference control signal, $R_{ref}$. Reference model module 90 may output the reference state trajectory signal, $X_{ref}$, to compensator module 88 and adaptation module 92.

Reference model module 90 may simulate operation of engine 12 using one or more reference models. Reference model module 90 may utilize any reference model capable of producing reference state trajectory signals, $X_{ref}$, of engine controlled variables, including multiple reference models over a range of operating conditions for engine 12. Reference models that may be used include, but are not limited to, at least one linear model, such as, a piecewise linear model; a nonlinear model, such as, nonlinear thermodynamic cycle model; or any other model capable of representing dynamic or steady-state performance of engine 12.

Compensator module 88 and reference model module 90 may operate together in a closed loop, in which reference model module 90 outputs the reference state trajectory signal, $X_{ref}$, to compensator module 88, which adjusts the reference control signal, $R_{ref}$, based on the reference state trajectory signal, $X_{ref}$. Compensator module 88 may adjust the control reference signal to produce a reference state trajectory signal, $X_{ref}$, from reference model module 90 that is similar to or substantially the same as a desired operation of engine 12. Compensator module 88 may be tuned across operating conditions based on the response to the reference state trajectory signal, $X_{ref}$, and continue to compensate for the reference state trajectory signal, $X_{ref}$, during operation of engine 12. By operating in a closed loop, compensator module 88 may use modeled engine information to adjust the control reference signal upstream of engine control module 76.

Adaptation module 92 may be included in signal analysis module 72 to determine error between actual engine operation and modeled engine operation and output a signal that allows engine control module 76 to compensate for this error. Error may include, for example, manufacturing variations in engine 12 that deviate from the engine model, degradations in performance of engine 12 over its life, and variations in sensors and actuators of the engine that may change over time. Adaptation module 92 includes a set of adaptation laws. The set of adaptation laws may be configured to generate an output, based on the trajectory difference between the reference state trajectory signal, $X_{ref}$, and the engine state trajectory signal, $X_{eng}$, to engine control module 76 to reduce or substantially cancel effects of uncertainties in signal analysis module 72. Adaptation module 92 may receive the reference state trajectory signal, $X_{ref}$, from reference model module 90 and the engine state trajectory signal, $X_{eng}$, from engine 12. The engine state trajectory signal, $X_{eng}$, may represent at least one engine control variable from actual operation of engine 12. The adaptation module may determine the adaptation signal, $R_{adp}$, based on the trajectory difference between the reference state trajectory signal, $X_{ref}$, and the engine state trajectory signal, $X_{eng}$, and one or more adaptation laws. The adaptation signal, $R_{adp}$, may represent an adjustment to one or more control parameters of engine control module 76 based on the trajectory difference between the reference state trajectory signals, $X_{ref}$, and the engine state trajectory signal, $X_{eng}$. For example, the adaptation signal, $R_{adp}$, may be an adjustment to controller gain of engine control module 76.

In addition to measured engine control variables, adaptation module 92 may be configured to receive unmeasured engine parameter estimates from, for example, a model-based engine module. Adaptation module 92 may determine the adaptation signal, $R_{adp}$, based on the reference state trajectory signal, $X_{ref}$, the engine state trajectory signal, $X_{eng}$, and an unmeasured engine parameter estimate.

Engine control module 76 may receive, for example, engine state trajectory signal, $X_{eng}$, engine parameter estimate signal (not shown), reference state trajectory signal, $X_{ref}$, reference control signal, $R_{ref}$, adaptation signal, $R_{adp}$, and operational mode signal (not shown) to generate a signal from the signals to control actuators (not shown) for engine 12 based on a set of control laws. The set of control laws may be algorithms and gain schedules with configurable parameters selected and configured to convert the reference control signal, $R_{ref}$, the adaptation signal, $R_{adp}$, and the engine state trajectory signal, $X_{eng}$, into a demand signal, $R_{dmd}$, that actuators or other control components in engine 12 may use to control engine control variables. The set of control laws may be selected and configured, for example, based on the characteristics of components, such as sensors, actuators, and propulsion components, of engine 12. Engine control module 76 may receive the reference control signal, $R_{ref}$, from closed-loop reference module 86, the adaptation signal, $R_{adp}$, from adaptation module 92, and the engine state trajectory signal, $X_{eng}$, from engine 12. Engine control module 76 may determine the demand signal, $R_{dmd}$, based on the reference control signal, $R_{ref}$, the adaptation signal, $R_{adp}$, and the engine state trajectory signal, $X_{eng}$. Engine control module 76 may output to engine 12 the demand signal, $R_{dmd}$, to control operation of at least one component of engine 12. The demand signal, $R_{dmd}$, may represent the control signal to engine 12 for the selected engine control variable.

In some examples, as discussed above, threshold analysis module 74 may determine if the reference control signal, $R_{ref}$, is within a threshold. For example, the reference control signal, $R_{ref}$, may be compared with a threshold before the reference control signal, $R_{ref}$, is output to engine control module 76. Alternatively, threshold analysis module 74 may determine if the demand signal, $R_{dmd}$, is within a threshold. For example, the reference control signal, $R_{ref}$, may be compared with a threshold before the reference control signal, $R_{ref}$, output to engine 12.

Engine 12 may receive the demand signal, $R_{dmd}$, from engine control module 76. Engine 12 may include control components such as sensors, as described above or other sensors, configured to measure engine control variables and actuators to control engine control variables. For example, the demand signal, $R_{dmd}$, may control the fuel delivery rate of fuel delivery device 25. While engine 12 may be shown in FIG. 3 to receive demand signal, $R_{dmd}$, it may be understood that control components, such as actuators, may receive demand signal $R_{dmd}$. The actuators may receive the demand signal, $R_{dmd}$, and adjust one or more engine control variable based on demand signal, $R_{dmd}$. Sensors in engine 12, including, but not limited to, oxygen sensor 18, pressure sensor 20, temperature sensor 22, fuel sensor 24, and exhaust sensor 26, may output the engine state trajectory signal, $X_{eng}$, to adaptation module 92 and signal analysis module 72. A variety of engines may be used with MRAC 82 including, but not limited to, gas turbine engines, such as turboprop, turbofan, turboshaft, turbojet, and the like.

The system described above may be used in engine control systems to improve engine performance and emissions control compared to a system that does not include controller 14. For example, signal analysis module 72 may receive, from closed-loop reference module 86, the reference control signal, $R_{ref}$. Closed-loop reference module 86 may execute a reference model that represents operation of engine 12 to determine the reference control signal, $R_{ref}$. By using a reference model to determine the reference control signal, $R_{ref}$, closed-loop reference module 86 may determine a reference control signal, $R_{ref}$, that results in operation of engine 12 within a selected threshold SFC or exhaust gas profile. Signal analysis module 72 may receive, from adaptation module 92, the adaptation signal, $R_{adp}$. And by determining the adaptation signal, $R_{adp}$, based on the difference between the reference state trajectory signal, $X_{ref}$, and the engine state trajectory signal, $X_{eng}$, adaptation module 92 may determine the adaptation signal, $R_{adp}$, to modify the control laws of engine control module 76 to more accurately control engine 12 to track performance of the reference model compared to, for example, a controller that does not have a reference model to modify control laws. Signal analysis module 72 may receive the engine state trajectory signal, $X_{eng}$. Signal analysis module 72 may determine the demand signal based on the engine state trajectory signal, $X_{eng}$, the adaptation signal, $R_{adp}$, and the reference control signal, $R_{ref}$. Signal analysis 72 may output, via engine control module 76, the demand signal, $R_{dmd}$, to control operation of at least one component of engine 12.

Although FIG. 3 illustrates closed-loop MRAC 82 directly controlling operation of engine 12, in some examples, closed-loop MRAC 82 may be implemented in a larger engine control system. A larger engine control system may include, for example, separate modules for steady-state operation, transient operation, and limit control. Functions performed by one or more of signal acquisition module 70, signal analysis module 72, threshold analysis module 74, and engine control module 76 are further explained below with reference to the example flow diagrams illustrated in FIG. 4.

Figure 4:
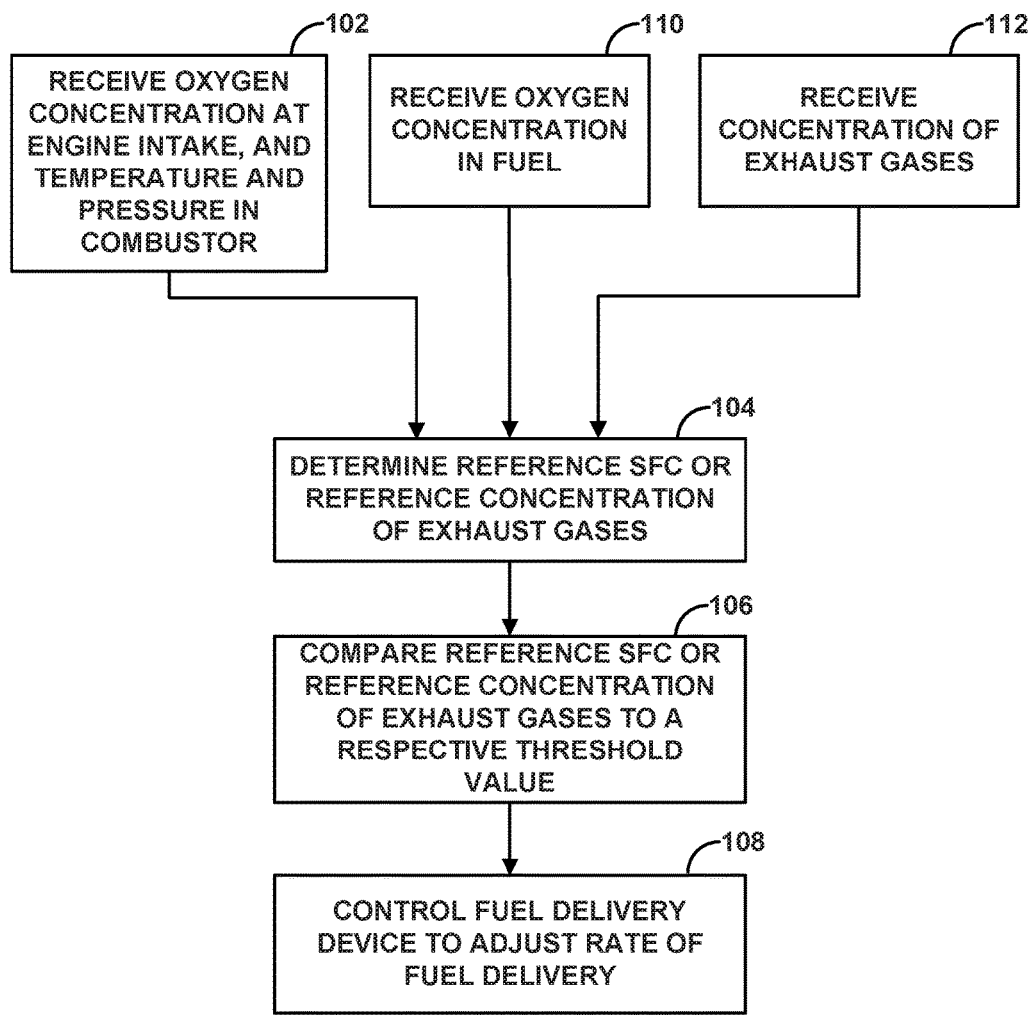
FIG. 4 is a flow diagram of an example technique for controlling an engine based at least in part on the amount of oxygen at the engine intake.

FIG. 4 is a flow diagram of an example technique for controlling operation of engine 12. Although the technique of FIG. 4 will be described with respect to engine control system 10 of FIG. 1 and controller 14 of FIGS. 1 and 2, in other examples, the technique of FIG. 4 may be performed using a different system and/or different controller. Additionally, engine control system 10 and controller 14 may perform other techniques to control operation of engine 12.

The technique illustrated in FIG. 4 includes receiving, by controller 14, for example, signal acquisition module 70, an oxygen signal indicative of an amount of oxygen at an intake of an engine, a pressure signal indicative of a pressure in a combustor station of the engine, and a temperature signal indicative of a temperature in at least one of the combustor station, the turbine station, and the exhaust station (102). For example, as discussed above, controller 14 may be communicatively coupled to each of intake sensor 18, pressure sensor 20, and temperature sensor 22. In some examples, controller 14 may passively receive oxygen signal, pressure signal, and temperature signal. In other examples, receiving the oxygen signal, pressure signal, and temperature signal may include transmitting a signal to at least to oxygen sensor 18, pressure sensor 20, and temperature sensor 22 to cause the oxygen sensor 18, pressure sensor 20, and temperature sensor 22 to acquire and transmit the respective oxygen signal, pressure signal, and temperature signal. Receiving the oxygen signal may include determining, by controller 14, an amount of oxygen at intake 42 based on the oxygen signal that may include at least one of the concentration of oxygen at the air intake, the flow rate at the air intake, the pressure at the air intake, and the temperature at the air intake, as discussed above.

The technique illustrated in FIG. 4 includes determining, by controller 14, for example, signal analysis module 72, at least one of a reference SFC of the engine or a reference amount of a respective exhaust gas of a plurality of exhaust gases based on at least one of the oxygen signal, the pressure signal, and the temperature signal (104). Determining at least one of the reference SFC of the engine or a reference amount of a respective exhaust gas may include using a reference table (e.g., a look-up table) or a reference model.

For example, the technique may include comparing, by controller 14 and, more particularly, signal analysis module 72 at least the oxygen signal, the pressure signal, and the temperature signal to a plurality of predetermined correlations (e.g., empirically determined correlations) relating a respective oxygen signal, pressure signal, and temperature signal to a respective at least one of the reference SFC or the reference amount of a respective exhaust gas. The plurality of predetermined correlations may be the same as discussed above. In other examples, the technique may include estimating, by controller 14, for example, signal analysis module 72, the reference SFC or the reference amount of a respective exhaust gas, or both, using the at least the oxygen signal, the pressure signal, and the temperature signal and a reference model, as discussed above.

The technique illustrated in FIG. 4 includes comparing, by controller 14, for example, threshold analysis module 74, at least one of the reference SFC or the reference amount of a respective exhaust gas of a plurality of exhaust gases to a respective threshold value (106). For example, as discussed above, the respective threshold value may be associated with a respective fuel flow rate that may result in a respective threshold SFC, threshold concentration of a respective exhaust gas, or both.

The technique illustrated in FIG. 4 includes controlling, by controller 14, for example, engine control module 76, fuel delivery device 25 to control the rate of fuel delivery based on the comparison (108). By controlling the rate of fuel delivery based on the comparison, the technique includes controlling a fuel flow rate to achieve at least one of a desired actual SFC of the engine or a desired actual amount of one or more respective exhaust gases of the plurality of exhaust gases.

In some examples, the technique may include receiving, by the controller, a fuel oxygen signal indicative of an amount of oxygen in the fuel delivery to the combustor (110). After receiving the fuel oxygen signal, the technique may include determining, by controller 14, the at least one of the reference SFC or the reference amount of a respective exhaust gas based on a total amount of oxygen in the fuel delivered to the combustor and oxygen at the intake of the engine, the pressure signal, and the temperature signal.

In some examples, the technique may include receiving, by the controller, an exhaust gas signal indicative of an amount of one or more respective exhaust gases of a plurality of exhaust gases at an exhaust of the engine (112). After receiving the exhaust gas signal, the technique may include determining, by controller 14, at least one of the reference SFC or the respective threshold value based on at least the exhaust gas signal.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A system comprising:
  an intake sensor configured to transmit an oxygen signal indicative of an amount of oxygen at an intake of an engine;
  a fuel delivery device configured to control a rate of fuel delivery from a fuel source to a combustor of the engine;
  a pressure sensor configured to transmit a pressure signal indicative of a pressure in the combustor;

a temperature sensor configured to transmit a temperature signal indicative of a temperature in the combustor; and
a controller configured to:
receive the oxygen signal, the pressure signal, and the temperature signal;
determine at least one of a reference specific fuel consumption (SFC) of the engine or a reference amount of a respective exhaust gas of a plurality of exhaust gases based on at least the oxygen signal, the pressure signal, and the temperature signal;
compare at least one of the reference SFC or the reference amount of a respective exhaust gas of a plurality of exhaust gases to a respective threshold value; and
control the fuel delivery device to control the rate of fuel delivery based on the comparison.

2. The system of claim 1, wherein controlling the rate of fuel delivery affects at least one of an actual SFC of the engine or the actual amount of one or more respective exhaust gases of the plurality of exhaust gases.

3. The system of claim 1, further comprising a fuel sensor configured to transmit a fuel oxygen signal indicative of an amount of oxygen in the fuel delivered to the combustor, wherein the controller is further configured to:
receive the fuel oxygen signal; and
determine the at least one of the reference SFC or the reference amount of the respective exhaust gas based on at least a total amount of oxygen in the fuel delivered to the combustor and at the intake of the engine, the pressure signal, and the temperature signal.

4. The system of claim 1, further comprising an exhaust sensor configured to transmit an exhaust gas signal indicative of an amount of one or more respective exhaust gases of a plurality of exhaust gases at an exhaust of the engine, wherein the controller is further configured to:
receive the exhaust gas signal; and
determine at least one of the reference SFC or the respective threshold value based on at least the exhaust gas signal.

5. The system of claim 4, wherein the plurality of exhaust gases comprises at least one of oxygen, an oxocarbon, a nitrogen oxide, a hydrocarbon, or an aldehyde.

6. The system of claim 1, wherein the controller is configured to determine the at least one of the reference SFC of the engine or the reference amount of the respective exhaust gas by at least comparing at least the oxygen signal, the pressure signal, and the temperature signal to a plurality of predetermined correlations relating a respective oxygen signal, pressure signal, and temperature signal to a respective at least one of the reference SFC or the reference amount of a respective exhaust gas.

7. The system of claim 1, wherein the controller is configured to control the fuel delivery device to control the rate of fuel delivery based on the comparison by at least:
determining a reference control signal based on at least the oxygen signal, the pressure signal, and the temperature signal and a reference model that represents operation of the engine;
determining a demand signal based on the reference control signal; and
outputting the demand signal to control the fuel delivery device to adjust the rate of fuel delivery.

8. The system of claim 1, wherein:
the oxygen signal comprises a trajectory of the amount of oxygen at the intake, the pressure signal comprises a trajectory of the pressure in the combustor, and the temperature signal comprises a trajectory of the temperature in the combustor, and
the controller is further configured to:
determine a reference control signal and a reference state trajectory signal based on at least one of the trajectory of the amount of oxygen at the intake, the trajectory of the pressure in the combustor, or the trajectory of the temperature in the combustor and a reference model that represents operation of the engine;
determine an adaptation signal based on a difference between the reference state trajectory signal and an engine state trajectory signal representative of actual operation of the engine;
determine a demand signal based on the engine state trajectory signal, the adaptation signal, and the reference control signal; and
output the demand signal to control the fuel delivery device to adjust the rate of fuel delivery.

9. The system of claim 1, wherein the engine comprises a gas turbine engine.

10. A method comprising:
receiving, by a controller, an oxygen signal indicative of an amount of oxygen at an intake of an engine, a pressure signal indicative of a pressure in a combustor of the engine, and a temperature signal indicative of a temperature in the combustor;
determining, by the controller, at least one of a reference specific fuel consumption (SFC) of the engine or a reference amount of a respective exhaust gas of a plurality of exhaust gases based on at least one of the oxygen signal, the pressure signal, and the temperature signal;
comparing, by the controller, at least one of the reference SFC or the reference amount of a respective exhaust gas of a plurality of exhaust gases to a respective threshold value; and
controlling, by the controller, a fuel delivery device to control the rate of fuel delivery based on the comparison.

11. The method of claim 1, wherein controlling the rate of fuel delivery affects at least one of an actual SFC of the engine or the actual amount of one or more respective exhaust gases of the plurality of exhaust gases.

12. The method of claim 10, further comprising:
receiving, by the controller, a fuel oxygen signal indicative of an amount of oxygen in the fuel delivery to the combustor; and
determining, by the controller, the at least one of the reference SFC or the reference amount of a respective exhaust gas based on a total amount of oxygen in the fuel delivered to the combustor and at the intake of the engine, the pressure signal, and the temperature signal.

13. The method of claim 10, further comprising:
receiving, by the controller, an exhaust gas signal indicative of an amount of one or more respective exhaust gases of a plurality of exhaust gases at an exhaust of the engine; and
determining, by the controller, at least one of the reference SFC or the respective threshold value based on at least the exhaust gas signal.

14. The method of claim 10, wherein the plurality of exhaust gases comprises at least one of oxygen, an oxocarbon, a nitrogen oxide, a hydrocarbon, or an aldehyde.

15. The method of claim 10, wherein determining, by the controller, the at least one of the reference SFC or the reference amount of a respective exhaust gas comprises comparing, by the controller, at least the oxygen signal, the pressure signal, and the temperature signal to a plurality of predetermined correlations relating the respective signal to a respective at least one of the reference SFC or the reference amount of a respective exhaust gas.

16. The method of claim 10, wherein controlling, by the controller, the fuel delivery device to control the rate of fuel delivery based on the comparison comprises:
   determining, by the controller, a reference control signal based on at least the oxygen signal, the pressure signal, and the temperature signal and a reference model that represents an operation of the engine;
   determining, by the controller, a demand signal based on the reference control signal; and
   outputting, by the controller, the demand signal to control the fuel delivery device to adjust the rate of fuel delivery.

17. The method of claim 10, wherein:
   the oxygen signal comprises a trajectory of the amount of oxygen at the intake, the pressure signal comprises a trajectory of the pressure in the combustor, and the temperature signal comprises a trajectory of the temperature in the combustor, and
   the method further comprises:
      determining, by the controller, a reference control signal and a reference state trajectory signal based on at least one of the trajectory of the amount of oxygen at the intake, the trajectory of the pressure in the combustor, or the trajectory of the temperature in the combustor and a reference model that represents operation of the engine;
      determining, by the controller, an adaptation signal based on a difference between the reference state trajectory signal and an engine state trajectory signal representative of actual operation of the engine;
      determining, by the controller, a demand signal based on the engine state trajectory signal, the adaptation signal, and the reference control signal; and
      outputting, by the controller, the demand signal to control the fuel delivery device to adjust the rate of fuel delivery.

18. A non-transitory computer-readable storage medium storing instructions that, when executed, cause a processor to:
   receive, by a controller, an oxygen signal indicative of an amount of oxygen at an intake of an engine, a pressure signal indicative of a pressure in a combustor of the engine, and a temperature signal indicative of a temperature in the combustor;
   determine, by the controller, at least one of a reference specific fuel consumption (SFC) of the engine or a reference amount of a respective exhaust gas of a plurality of exhaust gases based on at least one of the oxygen signal, the pressure signal, and the temperature signal;
   compare, by the controller, at least one of the reference SFC or the reference amount of a respective exhaust gas of a plurality of exhaust gases to a respective threshold value; and
   control, by the controller, a fuel delivery device to control the rate of fuel delivery based on the comparison.

19. The non-transitory computer-readable storage medium of claim 18, further storing instructions that, when executed, cause the processor to:
   receive, by the controller, a fuel oxygen signal indicative of an amount of oxygen in the fuel delivery to the combustor; and
   determine, by the controller, the at least one of the reference SFC or the reference amount of a respective exhaust gas based on a total amount of oxygen in the fuel delivered to the combustor and oxygen at the intake of the engine, the pressure signal, and the temperature signal.

20. The non-transitory computer-readable storage medium of claim 18, further storing instructions that, when executed, cause the processor to:
   receive, by the controller, an exhaust gas signal indicative of an amount of one or more respective exhaust gases of a plurality of exhaust gases at an exhaust of the engine; and
   determine, by the controller, at least one of the reference SFC or the respective threshold value based on at least the exhaust gas signal.

* * * * *